(12) United States Patent
Deur-Bert

(10) Patent No.: US 12,404,175 B2
(45) Date of Patent: Sep. 2, 2025

(54) PROCESS FOR PREPARING BIS(FLUOROSULFONYL) IMIDE

(71) Applicant: ARKEMA FRANCE, Colombes (FR)

(72) Inventor: Dominique Deur-Bert, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 872 days.

(21) Appl. No.: 17/604,829

(22) PCT Filed: Apr. 21, 2020

(86) PCT No.: PCT/EP2020/061062
§ 371 (c)(1),
(2) Date: Oct. 19, 2021

(87) PCT Pub. No.: WO2020/216734
PCT Pub. Date: Oct. 29, 2020

(65) Prior Publication Data
US 2022/0041448 A1    Feb. 10, 2022

(30) Foreign Application Priority Data

Apr. 25, 2019 (FR) ...................... 1904381

(51) Int. Cl.
*C01B 21/093*    (2006.01)
(52) U.S. Cl.
CPC ................ *C01B 21/0935* (2013.01)
(58) Field of Classification Search
CPC ................................. C01B 21/0935
See application file for complete search history.

(56) References Cited

U.S. PATENT DOCUMENTS

| | | | |
|---|---|---|---|
| 8,377,406 B1 * | 2/2013 | Singh | H01M 10/052 423/617 |
| 8,722,005 B1 * | 5/2014 | Poshusta | C01B 21/0935 564/82 |
| 2022/0041448 A1 * | 2/2022 | Deur-Bert | C01B 21/086 |

FOREIGN PATENT DOCUMENTS

| | | | | |
|---|---|---|---|---|
| CN | 106219503 A | | 12/2016 | |
| CN | 108002355 A | | 5/2018 | |
| CN | 109592655 A | * | 4/2019 | ........... C01B 21/093 |
| WO | 2009123328 A1 | | 10/2009 | |
| WO | 2015012897 A1 | | 1/2015 | |
| WO | 2017096333 A1 | | 6/2017 | |

OTHER PUBLICATIONS

ISA/EP; International Search Report and Written Opinion for International Patent Application No. PCT/EP2020/061062 dated May 12, 2020, 11 pages.

* cited by examiner

*Primary Examiner* — Yong L Chu
(74) *Attorney, Agent, or Firm* — NK Patent Law

(57) ABSTRACT

The invention relates to a process for preparing bis(fluorosulfonyl)imide, comprising the steps of: i) providing a stream A1 containing HF and a reactor containing a liquid phase A2 that contains bis(chlorosulfonyl)imide; ii) in said reactor, bringing said liquid phase A2 into contact with said stream A1 to produce bis(fluorosulfonyl)imide, said process being characterized in that said stream A1 is injected into said liquid phase A2.

13 Claims, 1 Drawing Sheet

[Fig. 1]
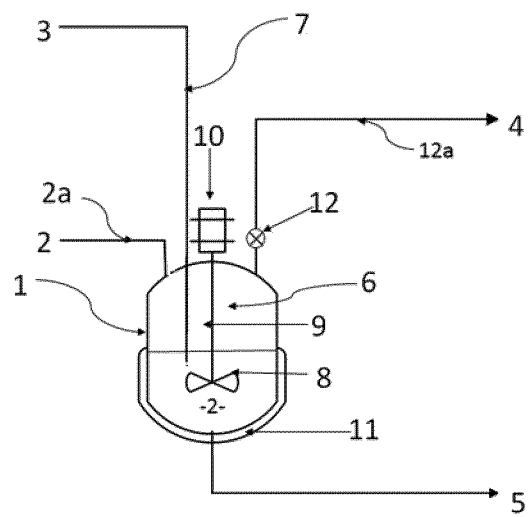
[Fig. 2]
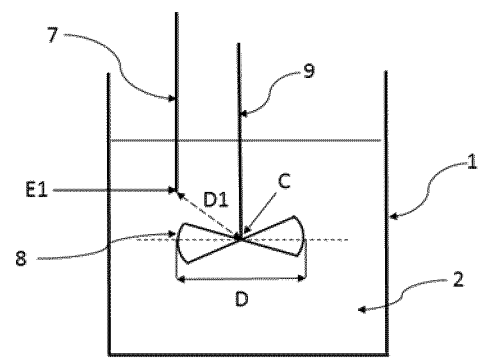

PROCESS FOR PREPARING BIS(FLUOROSULFONYL) IMIDE

CROSS-REFERENCE TO RELATED APPLICATIONS

This application is a U.S. National Stage application of International Patent Application No. PCT/EP2020/061062, filed on Apr. 21, 2020, which claims the benefit of French Patent Application No. FR1904381, filed on Apr. 25, 2019.

TECHNICAL FIELD

The present invention relates to a process for preparing bis(fluorosulfonyl)imide. In particular, the present invention relates to a process for preparing bis(fluorosulfonyl)imide from bis(halosulfonyl)imide.

PRIOR ART

By virtue of their very low basicity, anions of sulfonylimide type are increasingly used in the field of energy storage in the form of inorganic salts in batteries, or of organic salts in supercapacitors or in the field of ionic liquids. Since the battery market is booming and the reduction of battery manufacturing costs is becoming a major issue, a large-scale, low-cost synthesis process for anions of this type is required.

In the specific field of Li-ion batteries, the salt that is currently the most widely used is LiPF$_6$, but this salt has many drawbacks such as limited thermal stability, sensitivity to hydrolysis and thus lower safety of the battery. Recently, novel salts bearing the group FSO$_2^-$ have been studied and have demonstrated many advantages such as better ion conductivity and resistance to hydrolysis. One of these salts, LiFSI (LiN(FSO$_2$)$_2$), has shown highly advantageous properties which make it a good candidate for replacing LiPF$_6$.

There are various methods for preparing LiFSI. WO2009/123328 describes in particular the preparation of LiFSI from bis(chlorosulfonyl)imide, via various steps of preparing intermediate salts, such as for example a zinc bis(fluorosulfonyl)imide salt, followed by an ammonium bis(fluorosulfonyl)imide salt.

One of the reaction intermediates for attaining LiFSI is bis(fluorosulfonyl)imide. WO 2015/012897 describes the preparation of bis(fluorosulfonyl)imide by fluorination of bis(halosulfonyl) in the presence of hydrofluoric acid. The preparation of bis(fluorosulfonyl)imide, (HFSI), is obtained under hydrofluoric acid reflux conditions. Carrying out the process under these conditions can promote the formation of unwanted by-products. Moreover, the operating conditions applied in this process require a significant energy input which increases the carbon footprint of this process.

There is therefore still a need for a process for preparing bis(fluorosulfonyl)imide which does not have the above-mentioned drawbacks.

SUMMARY OF THE INVENTION

According to a first aspect, the present invention provides a process for preparing bis(fluorosulfonyl)imide comprising the steps of:
i) providing a stream A1 comprising HF and providing a reactor containing a liquid phase A2 comprising bis(halosulfonyl)imide;
ii) in said reactor, bringing said liquid phase A2 into contact with said stream A1 to produce bis(fluorosulfonyl)imide
characterized in that said stream A1 is injected into said liquid phase A2.

Preferably, said reactor comprises a means for mechanical stirring of said liquid phase A2. The term "mechanical stirring means" is understood to mean a stirring means that does not use a magnetic device inside said reactor such as for example a magnetic stirring bar.

The present invention makes it possible to ensure a homogeneity of hydrofluoric acid concentration at any point of the reactor and thus to avoid zones of the reaction medium in which the stationary concentration of HF is higher, which would lead to a marked increase in the formation of unwanted by-products and therefore a marked decrease in the bis(fluorosulfonyl)imide yield. The present invention also makes it possible to ensure homogeneity of the temperature at any point of the reaction medium, and to avoid obtaining hot spots in the reactor which also promote degradation reactions.

In order to control the stationary concentration of HF, preferably said stream A1 is injected continuously into said liquid phase A2.

According to a preferred embodiment, step ii) is carried out under pressure and temperature conditions so as to keep the bis(halosulfonyl)imide and the bis(fluorosulfonyl)imide produced in liquid form.

According to a preferred embodiment, during step ii), the temperature of said liquid phase A2 is kept substantially constant.

According to a preferred embodiment, during step ii), the temperature of said liquid phase A2 varies by at most 5° C. in absolute value, preferably by at most 3° C. in absolute value, more preferentially still by at most 2° C. in absolute value, or in particular by at most 1° C. in absolute value.

According to a preferred embodiment, said reactor also comprises a dip tube through which said stream A1 is injected into said liquid phase A2.

According to a preferred embodiment, said reactor comprises a means for mechanical stirring of said liquid phase A2 and said stream A1 is injected into said liquid phase A2 close to said mechanical stirring means.

According to a preferred embodiment, the rate of introduction, into said liquid phase A2, of the hydrofluoric acid contained in said stream A1 is at least 1 mol of HF/mole of bis(halosulfonyl)imide/hour and, preferably at most 100 mol of HF/mole of bis(halosulfonyl)imide/hour.

According to a preferred embodiment, step ii) is carried out with an HF/[bis(halosulfonyl)imide] molar ratio of at least 2.0 and at most 3.0.

According to a preferred embodiment, step ii) is carried out at a temperature above 0° C.

According to a preferred embodiment, the bis(halosulfonyl)imide compound is bis(chlorosulfonyl)imide.

According to another aspect, the present invention provides a process for preparing lithium bis(fluorosulfonyl)imide salt comprising the steps:
a) carrying out the bis(fluorosulfonyl)imide preparation process according to the present invention;
b) bringing the bis(fluorosulfonyl)imide into contact with a composition comprising at least one lithium salt in order to form said lithium bis(fluorosulfonyl)imide salt.

BRIEF DESCRIPTION OF THE FIGURES

FIG. 1 schematically represents a reactor for carrying out the process for preparing bis(fluorosulfonyl)imide according to one particular embodiment.

FIG. 2 schematically represents a simplified cross-sectional view of a reactor for carrying out the process for preparing bis(fluorosulfonyl)imide according to one particular embodiment.

DETAILED DESCRIPTION OF THE INVENTION

According to a first aspect, the present invention provides a process for preparing bis(fluorosulfonyl)imide. Preferably, said process comprises the steps of:
i) providing a stream A1 comprising HF and providing a reactor containing a liquid phase A2 comprising bis(halosulfonyl)imide;
ii) in said reactor, bringing said liquid phase A2 into contact with said stream A1 to produce bis(fluorosulfonyl)imide.

In the present process, said stream A1 may be a gas stream or a liquid stream. Thus, in said stream A1, the hydrofluoric acid may be in gaseous form or in liquid form.

According to a particular embodiment, said liquid phase A2 comprises bis(halosulfonyl)imide but is free of organic solvent. Thus, step ii) of fluorinating the bis(halosulfonyl)imide to bis(fluorosulfonyl)imide is carried out in the absence of organic solvent.

According to an alternative particular embodiment, said liquid phase A2 comprises bis(halosulfonyl)imide and an organic solvent. The organic solvent SO1 can be chosen from esters, nitriles, ethers, aromatic solvents, carbonates, cyclic or heterocyclic solvents and mixtures thereof. Preferably, the organic solvent SO1 is chosen from the group consisting of methyl acetate, butyl acetate, ethyl acetate, propyl acetate, isopropyl acetate, butyronitrile, valeronitrile, benzonitrile, diisopropyl ether, 2-methoxy-2-methylbutane, cyclopentyl methyl ether, benzene, toluene, chlorobenzene, dichlorobenzene, xylenes, ethylbenzene, 1,4-dioxane, dimethyl carbonate, ethylene carbonate, sulfolane and mixtures thereof.

Preferably, the hydrofluoric acid is anhydrous hydrofluoric acid. In the context of the invention, the term "anhydrous hydrofluoric acid" is understood to mean HF containing less than 500 ppm of water, preferably less than 300 ppm of water and preferably less than 200 ppm of water.

Preferably, said reactor comprises a mechanical stirring means. Preferably, said mechanical stirring means is a rotary mechanical stirring means. Said mechanical stirring means comprises a motor that imparts, via a shaft, a rotational movement to a stirring element which mixes said liquid phase A2. Said stirring element can be of various shapes. For example, the stirring element may be of the propeller, bladed turbine or anchor type.

The stirring element may be of the propeller type and comprise at least two blades, preferably 2, 3, 4, 5, 6, 7 or 8 blades. In this case, the stirring element gives rise to an essentially axial movement with low shear. The diameter of the stirring element is for example between ⅕ and ⅔ of the diameter of said reactor. Such a ratio between the diameter of the stirring element and the diameter of the reactor makes it possible to promote axial stirring and therefore homogenization and heat transfer. The pitch of the propeller is preferably between 0.5 and 3 times the diameter of the stirring element, in particular the pitch is equal to the diameter of the stirring element. The pitch refers here to the theoretical distance that the propeller advances in one complete 360° revolution. In this configuration, the blades of the stirring element may be arranged perpendicular to the shaft or be arranged in an inclined manner relative to the shaft.

The stirring element may be of bladed turbine type. In such a configuration, said stirring element comprises a horizontal disk, arranged on which are two or more blades, in particular 4 to 8 blades. In such a configuration, said stirring element induces an essentially radial flow. The diameter of the stirring element is for example between ⅕ and ⅔ of the diameter of said reactor. The blades can be flat or curved in shape. The blades are generally arranged perpendicular to the horizontal disk.

The stirring element may be of anchor type. This then consists of a U-shaped tube or a flat strip rotating in a diametral plane close to the wall of the reactor.

The presence of a rotary mechanical stirring means enables good homogeneity of the concentrations and temperatures at any point of the reactor. Specifically, the rotary mechanical stirring means promotes heat transfer with the walls of the reactor.

Preferably, said stream A1 is injected into said liquid phase A2. The term "injected" means that the stream A1 is introduced directly into the liquid phase A2. Thus, the hydrofluoric acid reacts with the bis(halosulfonyl)imide to form bis(fluorosulfonyl)imide. The bis(halosulfonyl)imide may be bis(chlorosulfonyl)imide, bis(bromosulfonyl)imide or bis(iodosulfonyl)imide or a mixture thereof. Preferably, in the present application, the bis(halosulfonyl)imide is bis(chlorosulfonyl)imide. In particular, said stream A1 is injected continuously into said liquid phase A2.

In addition, the implementation of step ii) results in the formation of a compound of formula HX in which X is Cl, Br or I. The compound of formula HX produced is preferably in gaseous form under the operating conditions of the present process, i.e. under the temperature and pressure conditions used for the present process, in particular in step ii). The compound of formula HX can be degassed from the reaction medium, for example by stripping with an inert gas (such as nitrogen, helium or argon). Preferably, the compound HX is continuously removed during the implementation of step ii). Preferably, the compound HX is HCl when the bis(halosulfonyl)imide is bis(chlorosulfonyl)imide. The compound HX is HBr when the bis(halosulfonyl)imide is bis(bromosulfonyl)imide. The compound HX is HI when the bis(halosulfonyl)imide is bis(iodosulfonyl)imide.

Preferably, step ii) is carried out under pressure and temperature conditions so as to keep the bis(halosulfonyl)imide and the bis(fluorosulfonyl)imide produced in liquid form.

Thus, step ii) may be carried out at atmospheric pressure or at a pressure greater than atmospheric pressure. Preferably, step ii) may be carried out at a pressure of less than 10 bara, advantageously at a pressure of less than 9 bara, preferably of less than 8 bara, more preferentially of less than 7 bara, in particular of less than 6 bara.

Step ii) may be carried out at a temperature above 0° C., advantageously above 5° C., preferably above 10° C., more preferentially above 15° C.

Preferably, step ii) is carried out at a temperature below 150° C., advantageously below 140° C., preferably below 130° C., more preferentially below 120° C., in particular below 110° C., more particularly below 100° C., favorably below 90° C., advantageously favorably below 80° C., preferentially favorably below 70° C., more preferentially favorably below 60° C., particularly favorably below 50° C.

Thus, step ii) may be carried out at a temperature above 0° C., advantageously above 5° C., preferably above 10° C., more preferentially above 15° C.; and at a temperature below 150° C., advantageously below 140° C., preferably below 130° C., more preferentially below 120° C., in particular below 110° C., more particularly below 100° C., favorably below 90° C., advantageously favorably below 80° C., preferentially favorably below 70° C., more preferentially favorably below 60° C., particularly favorably below 50° C.

Preferably, step ii) may be carried out at a temperature above 0° C., advantageously above 5° C., preferably above 10° C., more preferentially above 15° C.; and at a temperature below 150° C., advantageously below 140° C., preferably below 130° C., more preferentially below 120° C., in particular below 110° C., more particularly below 100° C., favorably below 90° C., advantageously favorably below 80° C., preferentially favorably below 70° C., more preferentially favorably below 60° C., particularly favorably below 50° C.; and at atmospheric pressure.

Preferably, step ii) may be carried out at a temperature above 0° C., advantageously above 5° C., preferably above 10° C., more preferentially above 15° C.; and at a temperature below 150° C., advantageously below 140° C., preferably below 130° C., more preferentially below 120° C., in particular below 110° C., more particularly below 100° C., favorably below 90° C., advantageously favorably below 80° C., preferentially favorably below 70° C., more preferentially favorably below 60° C., particularly favorably below 50° C.; and at a pressure of greater than 1 bara; and of less than 10 bara, advantageously at a pressure of less than 9 bara, preferably less than 8 bara, more preferentially less than 7 bara, in particular less than 6 bara.

Preferably, during step ii), the temperature of said liquid phase A2 is kept substantially constant. In the present application, the term "substantially constant" is understood to mean a temperature variation of at most 5° C. in absolute value, preferably of at most 3° C. in absolute value, more preferentially still of at most 2° C. in absolute value, or in particular of at most 1° C. in absolute value.

Thus, during step ii), the temperature of said liquid phase A2 varies by at most 5° C. in absolute value, preferably by at most 3° C. in absolute value, more preferentially still by at most 2° C. in absolute value, or in particular by at most 1° C. in absolute value.

This small variation in temperature is made possible by the injection, preferably continuously, of the stream A1 directly into the liquid phase A2 and particularly when said stream A1 is injected, preferably continuously, close to the stirring element, as explained below. This low temperature gradient of the liquid phase makes it possible to minimize or even eliminate the secondary reactions that can generate impurities such as $FSO_3H$ or $FSO_2NH_2$.

Preferably, in step ii), the rate of introduction, into said liquid phase A2, of the hydrofluoric acid contained in said stream A1 is at least 1 mol of HF/mole of bis(halosulfonyl)imide/hour, advantageously at least 5 mol of HF/mole of bis(halosulfonyl)imide/hour, preferably at least 10 mol of HF/mole of bis(halosulfonyl)imide/hour, more preferentially at least 20 mol of HF/mole of bis(halosulfonyl)imide/hour, in particular at least 30 mol of HF/mole of bis(halosulfonyl)imide/hour, more particularly at least 40 mol of HF/mole of bis(halosulfonyl)imide/hour, favorably at least 50 mol of HF/mole of bis(halosulfonyl)imide/hour.

In particular, in step ii), the rate of introduction, into said liquid phase A2, of the hydrofluoric acid contained in said stream A1 is at most 130 mol of HF/mole of bis(halosulfonyl)imide/hour, advantageously at most 120 mol of HF/mole of bis(halosulfonyl)imide/hour, preferably at most 110 mol of HF/mole of bis(halosulfonyl)imide/hour, in particular at most 100 mol of HF/mole of bis(halosulfonyl)imide/hour.

Thus, in step ii), the rate of introduction, into said liquid phase A2, of the hydrofluoric acid contained in said stream A1 is at least 1 mol of HF/mole of bis(halosulfonyl)imide/hour, advantageously at least 5 mol of HF/mole of bis(halosulfonyl)imide/hour, preferably at least 10 mol of HF/mole of bis(halosulfonyl)imide/hour, more preferentially at least 20 mol of HF/mole of bis(halosulfonyl)imide/hour, in particular at least 30 mol of HF/mole of bis(halosulfonyl)imide/hour, more particularly at least 40 mol of HF/mole of bis(halosulfonyl)imide/hour, favorably at least 50 mol of HF/mole of bis(halosulfonyl)imide/hour; and at most 130 mol of HF/mole of bis(halosulfonyl)imide/hour, advantageously at most 120 mol of HF/mole of bis(halosulfonyl)imide/hour, preferably at most 110 mol of HF/mole of bis(halosulfonyl)imide/hour, in particular at most 100 mol of HF/mole of bis(halosulfonyl)imide/hour.

In particular, in step ii), the rate of introduction, into said liquid phase A2, of the hydrofluoric acid contained in said stream A1 is at least 1 mol of HF/mole of bis(chlorosulfonyl)imide/hour, advantageously at least 5 mol of HF/mole of bis(chlorosulfonyl)imide/hour, preferably at least 10 mol of HF/mole of bis(chlorosulfonyl)imide/hour, more preferentially at least 20 mol of HF/mole of bis(chlorosulfonyl)imide/hour, in particular at least 30 mol of HF/mole of bis(chlorosulfonyl)imide/hour, more particularly at least 40 mol of HF/mole of bis(chlorosulfonyl)imide/hour, favorably at least 50 mol of HF/mole of bis(chlorosulfonyl)imide/hour.

More particularly, in step ii), the rate of introduction, into said liquid phase A2, of the hydrofluoric acid contained in said stream A1 is at most 130 mol of HF/mole of bis(chlorosulfonyl)imide/hour, advantageously at most 120 mol of HF/mole of bis(chlorosulfonyl)imide/hour, preferably at most 110 mol of HF/mole of bis(chlorosulfonyl)imide/hour, in particular at most 100 mol of HF/mole of bis(chlorosulfonyl)imide/hour.

Thus, in step ii), the rate of introduction, into said liquid phase A2, of the hydrofluoric acid contained in said stream A1 is at least 1 mol of HF/mole of bis(chlorosulfonyl)imide/hour, advantageously at least 5 mol of HF/mole of bis(chlorosulfonyl)imide/hour, preferably at least 10 mol of HF/mole of bis(chlorosulfonyl)imide/hour, more preferentially at least 20 mol of HF/mole of bis(chlorosulfonyl)imide/hour, in particular at least 30 mol of HF/mole of bis(chlorosulfonyl)imide/hour, more particularly at least 40 mol of HF/mole of bis(chlorosulfonyl)imide/hour, favorably at least 50 mol of HF/mole of bis(chlorosulfonyl)imide/hour; and at most 130 mol of HF/mole of bis(chlorosulfonyl)imide/hour, advantageously at most 120 mol of HF/mole of bis(chlorosulfonyl)imide/hour, preferably at most 110 mol of HF/mole of bis(chlorosulfonyl)imide/hour, in particular at most 100 mol of HF/mole of bis(chlorosulfonyl)imide/hour.

The rate of introduction of the hydrofluoric acid mentioned above makes it possible to avoid losses of HF, in particular when the latter is introduced in gaseous form. This therefore makes it possible to improve the overall efficiency of the process.

In addition, the rate of introduction of the HF can be controlled so as to maintain a low stationary concentration of HF in the reaction medium, i.e. in said liquid phase A2. The HF will then be consumed immediately in the fluorination reaction and the molar ratio between the HF and the bis(halosulfonyl)imide will be close to stoichiometry. The present process makes it possible to limit the use of an excess of HF. This represents a significant economic advantage; the cost of the HF requirement will be close to that of the theoretical HF requirement required by the stoichiometry of the reaction.

Thus, according to a preferred embodiment, step ii) is carried out with an HF/[bis(halosulfonyl)imide]molar ratio of at least 2.0, preferably of at least 2.05, in particular of at least 2.1. Preferably, step ii) is carried out with an HF/[bis(halosulfonyl)imide]molar ratio of at most 3.1, preferably of at most 3.0, in particular of at most 2.9.

Thus, step ii) is carried out with an HF/[bis(halosulfonyl)imide]molar ratio of at least 2.0, preferably of at least 2.05, in particular of at least 2.1; and of at most 3.1, preferably of at most 3.0, in particular of at most 2.9.

Preferably, step ii) is carried out with an HF/[bis(chlorosulfonyl)imide]molar ratio of at least 2.0, preferably of at least 2.05, in particular of at least 2.1. Preferably, step ii) is carried out with an HF/[bis(chlorosulfonyl)imide]molar ratio of at most 3.1, preferably of at most 3.0, in particular of at most 2.9.

Thus, step ii) is carried out with an HF/[bis(chlorosulfonyl)imide]molar ratio of at least 2.0, preferably of at least 2.05, in particular of at least 2.1; and of at most 3.1, preferably of at most 3.0, in particular of at most 2.9.

According to a preferred embodiment, said reactor comprises a dip tube. This makes it possible to inject said stream A1 directly into the liquid phase A2. Thus one of the ends E1 of the dip tube is placed in said liquid phase A2. Preferably, said dip tube is positioned close to said mechanical stirring means. As specified above, the, preferably rotary, mechanical stirring means comprises a stirring element. Said dip tube is thus positioned close to said stirring element. More particularly, the end E1 of the dip tube placed in said liquid phase A2 is positioned close to said mechanical stirring means, preferably close to said stirring element. This makes it possible to improve the diffusion of said stream A1 within said liquid phase A2. Such an arrangement between the dip tube and the stirring element ensures perfect temperature and concentration homogeneity within said liquid phase A2. Thus, the largest dimension of said stirring element passing through its center "C" is denoted "D". According to a particular embodiment, the shortest distance, denoted D1, between the end E1 of the dip tube placed in said liquid phase A2 and the center of said stirring element is less than 2*D. The center "C" of the stirring element is generally located on the central axis of said shaft of the mechanical stirring means (FIG. 2). Thus, according to a particular embodiment, said process comprises the steps of:

i) providing a stream A1 comprising HF and providing a reactor containing a liquid phase A2 comprising bis(halosulfonyl)imide; said reactor comprising a dip tube, one of the ends E1 of which is placed in said liquid phase A2 and a mechanical stirring means comprising a stirring element placed in said liquid phase A2;

ii) in said reactor, bringing said liquid phase A2 into contact with said stream A1 to produce bis(fluorosulfonyl)imide characterized in that said stream A1 is injected into said liquid phase A2 via said dip tube and the distance D1 between said end E1 of said dip tube and the center C of said stirring element is less than 2*D; D representing the largest dimension of said stirring element passing through its center C.

Preferably, said reactor may comprise a jacket. This makes it possible to guarantee homogeneous heating of the reactor and to ensure heat exchanges with said liquid phase A2.

Step ii) is preferably carried out in the absence of catalyst. This makes it possible to obtain very high yields as described below while avoiding the implementation of subsequent steps of purification of the bis(fluorosulfonyl)imide to remove all traces of the catalyst.

As specified in the present application, during step ii) the hydrofluoric acid will react with the bis(halosulfonyl)imide to form bis(fluorosulfonyl)imide. Thus, during the implementation of the method, said liquid phase A2 will become concentrated in bis(fluorosulfonyl)imide. The weight content of bis(fluorosulfonyl)imide in said liquid phase A2 will gradually increase and the weight content of bis(halosulfonyl)imide in said liquid phase A2 will conversely gradually decrease. The present process is carried out until the desired conversion or selectivity is obtained.

The present process achieves a conversion to bis(halosulfonyl)imide, preferably to bis(chlorosulfonyl)imide, of at least 95%, advantageously of at least 96%, preferably of at least 97%, more preferentially of at least 98%, in particular of at least 99%, more particularly of at least 99.2%, favorably of at least 99.5%, preferentially favorably of at least 99.8%, particularly favorably of 100%.

The present process makes it possible to obtain a bis(fluorosulfonyl)imide yield of at least 80%, advantageously of at least 85%, preferably of at least 90%, more preferentially of at least 95%.

The present process may also comprise a step iii) of degassing the reactor or of stripping in the presence of an inert gas. The inert gas is preferably nitrogen. This step makes it possible to remove the HCl possibly dissolved in said liquid phase A2 and to remove the unreacted HF.

Preferably, said process comprises a step iv) of recovering the bis(fluorosulfonyl)imide and optionally of purifying the latter.

FIG. 1 schematically illustrates a reactor 1 for carrying out the process for preparing bis(fluorosulfonyl)imide. The reactor 1 comprises a jacket 11, a dip tube 7 and a rotary mechanical stirring means 6. Said rotary mechanical stirring means 6 comprises a motor 10, a shaft 9 and a rotating element 8. The reactor also comprises a liquid phase 2 introduced into this reactor via the line 2a. This liquid phase 2 is introduced into the reactor prior to the implementation of the fluorination reaction. This liquid phase comprises bis(chlorosulfonyl)imide. The hydrofluoric acid 3 is introduced into the reactor via the dip tube 7. As illustrated in FIG. 1, the hydrofluoric acid 3 is injected into the liquid phase 2 through the dip tube, one of the ends of which is in the liquid phase 2. In addition, the end E1 of the dip tube 7 through which the HF is injected into the liquid phase is located close to the rotating element 8 as illustrated in FIG. 2. The distance D1 between the end E1 of the dip tube 7 and the center C of the stirring element 8 is less than twice the distance D, the latter representing the largest dimension passing through the center C of said stirring element 8 (FIG. 2). The hydrochloric acid formed during the reaction is continuously removed via a valve 12 and is recovered in 4 for subsequent treatment or purification. At the end of the reaction, the reactor 1, the liquid phase 2 of which comprises the bis(fluorosulfonyl)imide, can be emptied and the liquid phase 2 is recovered in 5 for subsequent treatment, for example purification or implementation of a process for preparing lithium bis(fluorosulfonyl)imide salt as described below.

According to a second aspect, the present invention relates to a process for preparing lithium bis(fluorosulfonyl)imide salt. Preferably, said process comprises the steps of:

a) carrying out the bis(fluorosulfonyl)imide preparation process according to the present invention;
b) bringing the bis(fluorosulfonyl)imide into contact with a composition comprising at least one lithium salt in order to form a composition comprising said lithium bis(fluorosulfonyl)imide salt. According to a preferred embodiment, the composition comprising at least one lithium salt is an aqueous composition, preferably an aqueous suspension or an aqueous solution.

According to another preferred embodiment, the composition comprising at least one lithium salt is a solid composition, preferably the composition consists of at least one solid lithium salt. In particular, the bis(fluorosulfonyl)imide is added to a container comprising the composition comprising at least one lithium salt. The container may be a reactor, preferably comprising at least one stirring system. The elements that make it possible to introduce the composition obtained in step b) are preferably resistant to HF.

According to one embodiment, the lithium salt is chosen from the group consisting of LiOH, LiOH.$H_2O$, $LiHCO_3$, $Li_2CO_3$, LiCl, and mixtures thereof. Preferably, the lithium salt is $Li_2CO_3$.

The composition, when it is an aqueous composition comprising at least one lithium salt, may be prepared by any conventional means for preparing an alkaline aqueous composition. This may be for example the dissolving of the lithium salt in ultrapure or deionized water, with stirring.

To determine the amount of lithium salt to be introduced, it is typically possible to carry out an analysis of the total acidity of the mixture to be neutralized.

According to one embodiment, step c) is such that:
the molar ratio of the lithium salt divided by the number of basicities of said salt relative to the bis(fluorosulfonyl)imide is greater than or equal to 1, preferably less than 5, preferably less than 3, preferentially between 1 and 2; and/or
the weight ratio of the lithium salt to the weight of water in the aqueous composition is between 0.1 and 2, preferably between 0.2 and 1, preferably between 0.3 and 0.7.

For example, the $Li_2CO_3$ salt has a number of basicities equal to 2.

Step b) of the process according to the invention can be carried out at a temperature less than or equal to 40° C., preferably less than or equal to 30° C., preferentially less than or equal to 20° C., and in particular less than or equal to 15° C.

According to one embodiment, the process according to the invention comprises an additional step of filtering the composition B obtained in step b), resulting in a filtrate F and a cake G. The lithium bis(fluorosulfonyl)imide salt may be contained in the filtrate F and/or in the cake G. The filtrate F may be subjected to at least one step of extraction with an organic solvent S typically sparingly soluble in water, in order to extract the lithium bis(fluorosulfonyl)imide salt into an organic phase. The extraction step typically results in the separation of an aqueous phase and an organic phase. In the context of the invention, and unless otherwise indicated, the term "sparingly soluble in water" is intended to mean a solvent of which the solubility in water is less than 5% by weight. The abovementioned organic solvent S is in particular chosen from the following families: esters, nitriles, ethers, chlorinated solvents and aromatic solvents, and mixtures thereof. Preferably, the organic solvent S is chosen from dichloromethane, ethyl acetate, butyl acetate, tetrahydrofuran, diethyl ether and valeronitrile, and mixtures thereof. In particular, the organic solvent S is butyl acetate.

For each extraction, the weight amount of organic solvent used may vary between ⅙ and 1 times the weight of the filtrate F. The number of extractions may be between 2 and 10. Preferably, the organic phase, resulting from the extraction(s), has a weight content of lithium bis(fluorosulfonyl)imide salt ranging from 5% to 40% by weight. The separated organic phase (obtained at the end of the extraction) may then be concentrated to reach a concentration of lithium bis(fluorosulfonyl)imide salt of between 30% and 60%, preferably between 40% and 50% by weight, it being possible for said concentration to be achieved by any evaporation means known to those skilled in the art.

The abovementioned cake G may be washed with an organic solvent 5' chosen from the following families: esters, nitriles, ethers, chlorinated solvents and aromatic solvents, and mixtures thereof. Preferably, the organic solvent 5' is chosen from dichloromethane, ethyl acetate, butyl acetate, tetrahydrofuran, acetonitrile, diethyl ether and valeronitrile, and mixtures thereof. In particular, the organic solvent 5' is butyl acetate. The weight amount of organic solvent 5' used may range between 1 and 10 times the weight of the cake. The total amount of organic solvent 5' intended for the washing may be used in a single portion or in several portions for the purpose notably of optimizing the dissolution of the lithium bis(fluorosulfonyl)imide salt. Preferably, the organic phase, resulting from the washing(s) of the cake G, has a weight content of lithium bis(fluorosulfonyl)imide salt ranging from 5% to 20% by weight. The separated organic phase resulting from the washing(s) of the cake G may then be concentrated to reach a concentration of lithium bis(fluorosulfonyl)imide salt of between 30% and 60%, preferably between 40% and 50% by weight, it being possible for said concentration to be achieved by any evaporation means known to those skilled in the art. According to one embodiment, the organic phases resulting from the extraction(s) of the filtrate F and from the washing(s) of the cake G may be pooled, before a concentration step.

Example 1

394 g of liquid bis(chlorosulfonyl)imide (HCSI) and 19.7 g of liquid 1,4-dioxane are introduced into a stirred 1-liter reactor. The weight ratio between the 1,4-dioxane and the HCSI is 5%. The mixture is stirred using a turbine with 6 inclined blades and is brought to 40° C., prior to the introduction of the hydrofluoric acid. The reaction is carried out by regulating the temperature of the reaction medium at 40° C. and by continuously injecting gaseous HF. The gaseous HF is slowly injected directly into the liquid reaction medium by means of a dip tube. The total amount of HF injected is 110 g, which corresponds to an HF molar ratio relative to the HCSI of 3. The rate of introduction of the gaseous HF is regulated at 37 g/h. The reaction time is 3 hours. The reaction is accompanied by the formation of HCl which is continuously removed from the reactor. The gases leaving the reactor are sent to a water trap. When all the HF has been introduced, a stream of nitrogen with a flow rate of 50 l/h is introduced into the reactor so as to strip the HF and HCl that may be dissolved in the reaction medium. This stripping is carried out for 5 h and the temperature of the medium is maintained at 40° C. The stripping gases leaving the reactor are also sent to a water trap. After stripping, the reactor contains 336.3 g of crude bis(fluorosulfonyl)imide (HFSI). The composition of this crude HFSI is analyzed by NMR.

| Composition of the crude HFSI in % by weight | |
|---|---|
| HFSI | 90.14 |
| FSO3H | 1.20 |
| FSO2NH2 | 0.39 |
| HF | 2.38 |
| 1,4-dioxane | 5.89 |

The conversion of the HCSl is complete and reaches 100%. The yield of HFSI is 90.8%.

Example 2

397 g of liquid bis(chlorosulfonyl)imide (HCSl) and 12 g of liquid 1,4-dioxane are introduced into a stirred 1-liter reactor. The weight ratio between the 1,4-dioxane and the HCSl is 3%. The mixture is stirred using a turbine with 6 inclined blades and is brought to 45° C., prior to the introduction of the hydrofluoric acid. The reaction is carried out by regulating the temperature of the reaction medium at 45° C. and by continuously injecting gaseous HF. The gaseous HF is slowly injected directly into the liquid reaction medium by means of a dip tube. The total amount of HF introduced is 100 g, which corresponds to an HF molar ratio relative to the HCSl of 2.7. The rate of introduction of the gaseous HF is regulated at 38 g/h. The reaction time is 2 hours and 40 minutes. The reaction is accompanied by the formation of HCl which is continuously removed from the reactor. The gases leaving the reactor are sent to a water trap. When all the HF has been introduced, a stream of nitrogen with a flow rate of 50 l/h is introduced into the reactor so as to strip the HF and HCl that may be dissolved in the reaction medium. This stripping is carried out for 5 h and the temperature of the medium is maintained at 45° C. The stripping gases leaving the reactor are also sent to a water trap.

After stripping, the reactor contains 339.5 g of crude bis(fluorosulfonyl)imide (HFSI). The composition of this crude HFSI is analyzed by NMR.

| Composition of the crude HFSI in % by weight | |
|---|---|
| HFSI | 92.92 |
| FSO3H | 1.23 |
| FSO2NH2 | 0.42 |
| HF | 1.92 |
| 1,4-dioxane | 3.51 |

The conversion of the HCSl is complete and reaches 100%. The yield of HFSI is 93.9%.

The invention claimed is:

1. A process for preparing bis(fluorosulfonyl)imide comprising the steps of:
   i. providing a stream A1 comprising HF and providing a reactor containing a liquid phase A2 comprising bis(halosulfonyl)imide, excluding bis(fluorosulfonyl)imide;
   ii. in said reactor, bringing said liquid phase A2 into contact with said stream A1 to produce bis(fluorosulfonyl)imide; wherein said stream A1 is injected into said liquid phase A2, wherein when unreacted HF is removed from the reactor, it is not returned to the reactor, wherein said reactor also comprises a dip tube through which said stream A1 is injected into said liquid phase A2.

2. The process as claimed in claim 1, wherein said reactor comprises a mechanical stirring means for mechanical stirring of said liquid phase A2, wherein said mechanical stirring means does not use a magnetic device inside said reactor.

3. The process as claimed in claim 1, wherein step ii) is carried out under pressure and temperature conditions so as to keep the bis(halosulfonyl)imide and the bis(fluorosulfonyl)imide produced in liquid form.

4. The process as claimed in claim 1, wherein, during step ii), the temperature of said liquid phase A2 is kept substantially constant.

5. The process as claimed in claim 1, wherein, during step ii), the temperature of said liquid phase A2 varies by at most 5° C. in absolute value.

6. The process as claimed in claim 1, wherein said reactor comprises a mechanical stirring means for said liquid phase A2 and said stream A1 is injected into said liquid phase A2 close to said mechanical stirring means.

7. The process as claimed in claim 1, wherein the rate of introduction, into said liquid phase A2, of the hydrofluoric acid contained in said stream A1 is at least 1 mol of HF/mole of bis(halosulfonyl)imide/hour.

8. The process as claimed in claim 1, wherein step ii) is carried out with an HF/[bis(halosulfonyl)imide]molar ratio of at least 2.0 and at most 3.0.

9. The process as claimed in claim 1, wherein step ii) is performed at a temperature above 0° C.

10. The process as claimed in claim 1, wherein the bis(halosulfonyl)imide compound is bis(chlorosulfonyl)imide.

11. A process for preparing a lithium bis(fluorosulfonyl)imide salt, comprising the steps:
   a) carrying out the process for preparing the bis(fluorosulfonyl)imide as claimed in claim 1;
   b) bringing the bis(fluorosulfonyl)imide into contact with a composition comprising at least one lithium salt in order to form said lithium bis(fluorosulfonyl)imide salt.

12. The process as claimed in claim 1, wherein step ii) is carried out at a temperature above 15° C. and below 50° C.

13. The process as claimed in claim 1, wherein step ii) is carried out in the absence of a catalyst.

* * * * *